United States Patent
Franco et al.

(10) Patent No.: US 6,814,530 B2
(45) Date of Patent: Nov. 9, 2004

(54) HYBRID PANEL FASTENER WITH SNAP-ON CAP

(75) Inventors: James S. Franco, Wind Gap, PA (US); William P. McDonough, Collegeville, PA (US)

(73) Assignee: PEM Management, Inc., Wilmington, DE (US)

( * ) Notice: Subject to any disclaimer, the term of this patent is extended or adjusted under 35 U.S.C. 154(b) by 0 days.

(21) Appl. No.: 10/468,853

(22) PCT Filed: Apr. 12, 2002

(86) PCT No.: PCT/US02/11378

§ 371 (c)(1),
(2), (4) Date: Aug. 25, 2003

(87) PCT Pub. No.: WO02/086334

PCT Pub. Date: Oct. 31, 2002

(65) Prior Publication Data

US 2004/0131444 A1 Jul. 8, 2004

Related U.S. Application Data

(60) Provisional application No. 60/284,902, filed on Apr. 20, 2001.

(51) Int. Cl.[7] .............................. F16B 21/18; F16B 39/00
(52) U.S. Cl. ....................... 411/353; 411/107; 411/171; 411/970; 411/999
(58) Field of Search .................................. 411/107, 171, 411/258, 352, 353, 930, 970, 999

(56) References Cited

U.S. PATENT DOCUMENTS

| 5,642,972 A | | 7/1997 | Ellis et al. |
| 5,738,477 A | | 4/1998 | McCorkle et al. |
| 5,741,101 A | | 4/1998 | Gulistan |
| 5,743,692 A | | 4/1998 | Schwarz |
| 6,079,923 A | * | 6/2000 | Ross et al. ............... 411/107 X |
| 6,394,724 B1 | * | 5/2002 | Kelly et al. ................. 411/353 |

* cited by examiner

Primary Examiner—Neill Wilson
(74) Attorney, Agent, or Firm—Gregory J. Gore

(57) ABSTRACT

A two-piece panel fastener includes a barrel-shaped metal retainer which holds a screw. The screw includes a threaded shaft and a plastic cap which has longitudinally-extending resilient fingers which engage the outer surface of the retainer to captivate the screw. The retainer has a chamfered top flange along its top edge, a circumferential bulge area around its outer surface approximately in the middle of its length, and a base at the bottom. Two circumferential valley regions of reduced diameter are located along the outer surface of the retainer. The first valley region is located between the chamfered top flange and the bulge area and the second is located between the bulge area and the base. When the fingers occupy either of the valley regions, the screw is captively held at either of two stable positions of retraction or extension. The retainer is preferably rigidly affixed to a circuit board by soldering a base flange at the bottom of the retainer to the top surface of the board. After the retainer is separately soldered to the circuit board and the retainer has cooled, the screw and cap assembly are joined to the retainer by snap action of the resilient cap fingers.

13 Claims, 2 Drawing Sheets

HYBRID PANEL FASTENER WITH SNAP-ON CAP

The present application is related to provisional patent application Ser. No. 60/284,902 entitled "Hybrid Panel Fastener With Snap-On Cap" filed on Apr. 20, 2001, priority from which is hereby claimed.

FIELD OF THE INVENTION

The present invention relates to panel fasteners affixed to circuit boards and, in particular, to panel fasteners of the type having a molded cap composed of a material such as ABS Plastic. More specifically, it relates to panel fasteners of the type disclosed in U.S. patent application Ser. No. 09/739,689 entitled "Snap-In Panel Fastener" which is herein incorporated by reference as though fully set forth.

BACKGROUND OF THE INVENTION

There are cases in which panel fasteners of the hybrid type, that is fasteners in which the screw portion has a molded-on plastic cap for ease of manual operation, are required to be soldered to a printed circuit board. A problem arises, however, due to the soldering temperature required to affix the retainer portion of the panel fastener to the PCB because the soldering heat has an adverse effect on the materials used in the plastic portion of the panel fastener. This problem not only arises with regard to soldering to PCBs but may also arise in other situations where attachment of the retainer to a base panel requires elevated temperatures. There is therefore a need in the art to provide a hybrid-type panel fastener that may be soldered or applied to a base panel by heating without adversely affecting its plastic portion.

SUMMARY OF THE INVENTION

In order to meet this need in the art, the present invention has been devised in which the two main components of the panel fastener, the screw cap portion and the metal retainer portion, are assembled together after the retainer is soldered to the PCB and the retainer has cooled. The screw cap assembly is later attached to the soldered retainer by the snap action of its resilient parts. Since the screw cap is away from the heat during soldering the retainer, it cannot be adversely affected. Accordingly, the present invention provides a unique snap-together method provided by its structure which permits a low insertion force that can be accomplished by hand as well as automatic equipment so that the fastener can easily be installed onto a retainer after it has been soldered to a circuit board without damage to the PCB. Since the high force of assembly required by prior art hybrid-type panel fasteners would severely damage the PCB and also require expensive installation equipment and tooling, the low assembly force of the screw cap assembly to the retainer of the invention avoids these problems.

More specifically, the applicants have invented a two-piece panel fastener comprising a generally barrel-shaped metal retainer which holds a screw. The retainer has a chamfered top flange along its top edge, a circumferential bulge area along its outer surface approximately in the middle of its length, and a base at the bottom. Two circumferential valley regions of reduced diameter are located along the outer surface of the retainer. The first valley region is located between the chamfered top flange and the bulge area and the second is located between the bulge area and the base. The screw includes a threaded shaft and a plastic cap which has longitudinally-extending resilient fingers as means to engage the outer surface of the retainer to captivate the screw. The screw is captively held at either of two stable positions of retraction or extension where the fingers occupy either of the valley regions. The retainer is preferably rigidly affixed to a circuit board by soldering a base flange at the bottom of the retainer to the top surface of the panel. The shank extends axially downward from the flange and lies within a hole in the PCB during soldering. The threaded portion of the screw extends beyond the shank of the retainer when the screw is in the extended position.

The method of assembling the captive panel fastener to a printed circuit board comprises the steps of placing an axially-extending shank of a captive fastener retainer through a mounting hole in a printed circuit board, soldering the retainer to the printed circuit board, cooling the retainer, and then affixing a retractable screw assembly including a plastic screw cap to the retainer by snap attachment of the screw cap to an outside surface of the retainer.

In another embodiment, the panel fastener comprises a generally cylindrical retainer having a base flange at the bottom. An inward-facing flange is located at the top of a through-hole in the retainer, and includes a lead-in ramp at the top and a steep angle on an underside. The screw has a threaded shaft and a plastic cap rigidly affixed to its head. A deformable ring is located around the shaft of the screw at the top of a threaded region and has a relaxed diameter greater than the inside diameter of the retainer through-hole flange such that the ring engages an underside of the flange when the screw is retracted thereby captivating the screw.

The applicants have therefore devised a unique two-piece hybrid panel fastener with a structure and method of attachment which permits it to be used in solder-on applications to PCBs without damage to either the fastener or the PCB. Other objects and advantages of the present invention will become apparent to those of skill in the art from the following drawings and description of the preferred embodiment.

DESCRIPTION OF THE PREFERRED EMBODIMENT

Figure 1:
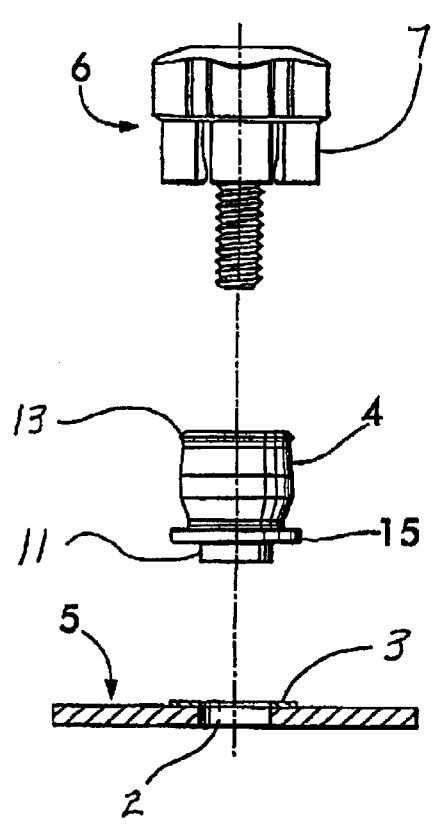
FIG. 1 is a side assembly view of the present invention showing the installation sequence of the present invention.

Referring now to FIG. 1, the sequence of assembly of the main components of the present invention is shown. A preform or solder paste 3 is first applied to the PCB beneath the flange 15 at the base of the barrel-shaped retainer 4. With shank 11 inserted through a hole 2 in the PCB, base flange 15 rests against the top surface of the PCB during wave or hot air soldering, providing vertical alignment and increased PCB contact surface area. After wave or hot air soldering is complete, the retainer becomes permanently attached to the PCB 5. Later, after the PCB and retainer have cooled, the screw cap assembly 6 is attached to the retainer by inserting the threaded end into the top of the retainer and pushing it downward. As the screw cap is pushed downward, the plastic fingers 7 on the screw cap deflect outwardly and snap over chamfered top flange 13.

Figure 2:
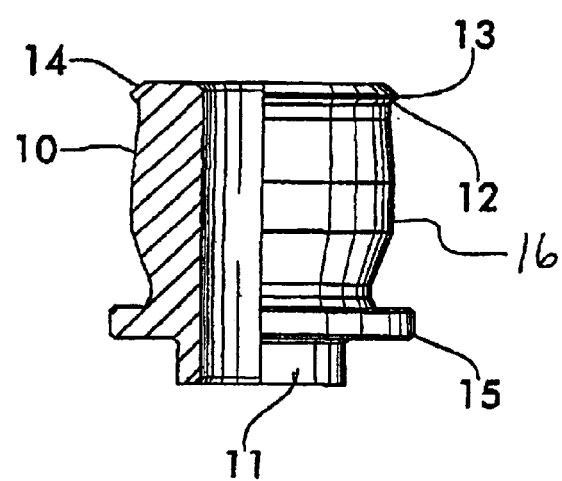
FIG. 2 is a side and part sectional view of the retainer portion of the present invention.

Referring to FIG. 2, the retainer portion of the present invention is shown. It includes significant novel features which allow its use according to the above-described installation into PCBs. A shank 11 at the bottom of the retainer 4 extends from flange 15 and provides for insertion into a clearance hole in the PCB which locates the retainer. A chamfered top flange 13 along the top edge of the retainer is included to provide the inwardly-biased elastic fingers on the screw cap with an angled lead-in surface 14. A backside surface 12 restricts disassembly of the cap in the direction of retraction. The greatest diameter of the bulge may further include a flat portion 16, i.e. a cylindrical surface along the longitudinal axis of the retainer.

Figure 3A:
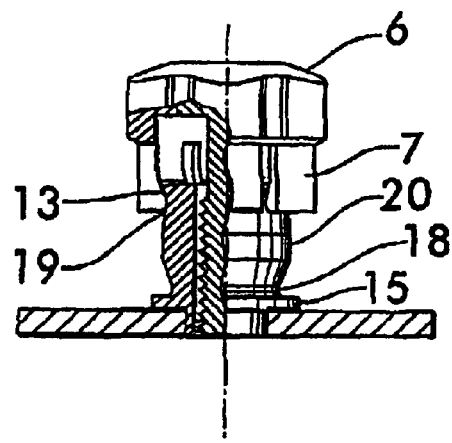
FIGS. 3a and 3b are side and part sectional views showing the screw cap assembly in its retracted and fully-extended positions.
Figure 3B:
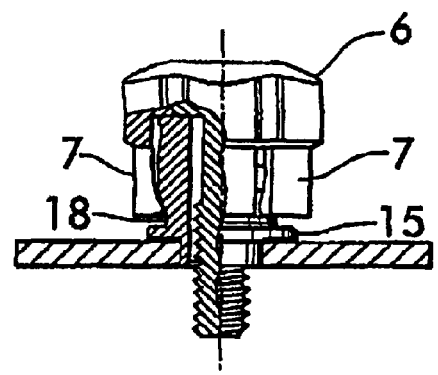

Referring now to FIGS. 3a and 3b, the present invention is shown in both its retracted position and in its extended position, respectively. A bulge area 20 along the sides of the retainer between its top and bottom ends bears against the fingers of the screw cap 6 to bias the cap into the valley regions at either of the extended or retracted positions. Additionally, the bulge area of the retainer may include a flat portion as described with regard to FIG. 2 so that the screw cap may achieve an unbiased position mid-way between the extended and retracted positions. In FIG. 3a, the tips of the fingers 7 on cap 6 occupy valley 19 at the top of the retainer just below the chamfered top flange 13 which holds the cap in the retracted position. As shown in FIG. 3b, when the screw cap 6 is pushed down farther, a valley at the base of the retainer 18 just above the flange 15 captures inwardly-biased resilient fingers 7 to hold the screw assembly in an extended position where the end of the screw extends beyond the shank of the retainer. It should be understood that the sides of the retainer may have as many valleys as desired in order to provide alternate stable longitudinal positions of the screw cap with respect to the retainer.

Figure 4A:
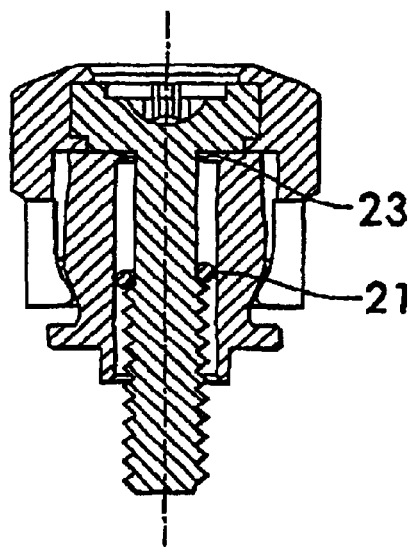
FIGS. 4a and 4b depict two side sectional views showing the extended and retracted positions of an alternate embodiment of the snap-on hybrid-type panel fastener of the present invention.
Figure 4B:
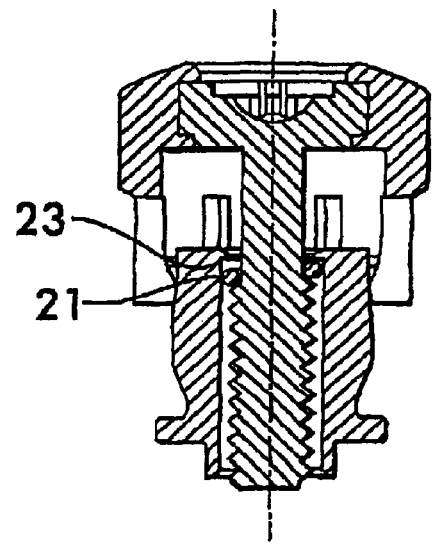

Referring now to FIGS. 4a and 4b, an alternate embodiment of the present invention with different means of screw captivation is shown in retracted and extended positions. In this embodiment, the screw portion of the fastener is held captive in the retainer by an inwardly-facing flange 23 which provides a reduced diameter at the top of the through-hole in the retainer. The through-hole provides a close clearance for the screw threads. The flange 23 dimensionally restricts a flexible rubber ring 21 which is either assembled or manufactured over the last thread on the screw cap assembly as shown. As in the first embodiment, the screw cap is inserted into the retainer after the retainer is permanently attached to the PCB, however in this case there is no outer chamfered top flange to provide the snap-together function to captivate the screw in the retracted position. In this second embodiment, the screw cap assembly snaps into the retainer as the rubber ring 21 deforms and passes by the inward-facing flange 23 at the top of the through-hole. The shape of the rubber ring in cooperation with a lead-in ramp at the top of the flange 23 provides for a low insertion force while a steep angle on the underside of the flange requires a high removal force and thus captivates the screw.

From the foregoing description of the invention it will be apparent that the objects of the invention have been achieved. Other modifications may be made which will be obvious to one of skill in the art from the description of the preferred embodiment, however the scope of the applicant's invention should be limited only by the following claims and their legal equivalents.

What is claimed is:

1. A two-piece panel fastener, comprising:
    a generally barrel-shaped retainer including a tap flange along atop edge of its outer surface, an axial through-bore, and a base at a bottom thereof,
    a circumferential bulge area along the outer surface of the retainer in approximately the middle of the retainer along its length;
    two circumferential valley regions of reduced diameter along the outer surface of the retainer, a first valley region located between said top flange and said bulge area, and a second valley region located between the bulge area and the base; and
    a screw located within said through-bore and having a threaded shaft and a plastic cap rigidly affixed to a head of the screw, said cap including resiliently deformable means engaging the outer surface of said retainer to captivate said screw within said retainer.

2. The panel fastener of claim 1 further including a base flange at the bottom of the retainer.

3. The panel fastener of claim 2 further including a shank extending axially downward from said base flange.

4. The panel fastener of claim 1 wherein said retainer is metal.

5. The panel fastener of claim 1 wherein said resiliently deformable means engaging the outer surface of said retainer are longitudinally-extending fingers which are inwardly-biased.

6. The panel fastener of claim 5 wherein said screw is captively held within said retainer at two biased positions where said fingers occupy said valley regions.

7. The panel fastener of claim 6 wherein said two stable positions are a position of retraction and a position of extension, the threaded portion of said screw extending beyond the shank of said retainer when said screw is in said position of extension.

8. The panel fastener of claim 7 farther including a circuit board to which said retainer is rigidly affixed.

9. The assembly of parts of claim 8 wherein said retainer is affixed to said circuit board by soldering.

10. The panel fastener of claim 7 farther including a longitudinally-extending cylindrical surface area of said retainer located on said bulge area.

11. The panel fastener of claim 1 wherein said top flange is chamfered.

12. The panel fastener of claim 1 wherein said screw is composed of plastic.

13. A panel fastener, comprising:
    a generally barrel-shaped retainer having a base at the bottom thereof,
    an inward-facing flange located at the top of a through-hole in the retainer, said flange including a lead-in ramp at the top of the flange and a steep angle on an underside of the flange;
    a circumferential bulge area along the outer surface of the retainer located in the middle of the retainer along its length;
    a circumferential valley region of reduced diameter along the outer surface of the retainer located below the bulge area; and
    a screw having a threaded shaft and a plastic cap rigidly affixed to the screw, said screw lying within said through-bore and including a deformable ring located at the top of a threaded region of said shaft, the relaxed outer diameter of said deformable ring being greater than the inside diameter of said retainer through-hole flange whereby said ring engages an underside of said flange when said screw is retracted thereby captivating said screw within said retainer.

* * * * *